United States Patent
Fox et al.

(10) Patent No.: US 7,523,071 B2
(45) Date of Patent: Apr. 21, 2009

(54) ON-LINE SOFTWARE RENTAL

(75) Inventors: Allen Fox, San Jose, CA (US); Jesse Macnish, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/667,129

(22) Filed: Sep. 16, 2003

(65) Prior Publication Data
US 2004/0128250 A1    Jul. 1, 2004

Related U.S. Application Data

(60) Provisional application No. 60/411,279, filed on Sep. 16, 2002.

(51) Int. Cl.
*G06F 17/60* (2006.01)
(52) U.S. Cl. .......................... 705/52; 705/53
(58) Field of Classification Search ................... 705/52, 705/53
See application file for complete search history.

(56) References Cited

U.S. PATENT DOCUMENTS

| | | | |
|---|---|---|---|
| 5,613,089 A * | 3/1997 | Hornbuckle | ................ 711/164 |
| 5,654,746 A | 8/1997 | McMullan, Jr. et al. | |
| 5,761,651 A | 6/1998 | Hasebe et al. | |
| 5,910,987 A | 6/1999 | Ginter et al. | |
| 6,526,456 B1 * | 2/2003 | Allan et al. | ................ 719/328 |
| 6,584,450 B1 * | 6/2003 | Hastings et al. | ............... 705/26 |
| 6,744,446 B1 * | 6/2004 | Bass et al. | .................. 715/734 |
| 6,745,207 B2 * | 6/2004 | Reuter et al. | ................ 707/200 |

FOREIGN PATENT DOCUMENTS

JP    2006344124 A    * 12/2006

OTHER PUBLICATIONS

International Search Report, International Application No. PCT/US03/30005, Mar. 31, 2004.
Official Communication from Korean Intellectual Property Office, Korean Patent Application No. 10-2005-7004429 (with english translation, 25 pages).

* cited by examiner

*Primary Examiner*—Pierre E Elisca
(74) *Attorney, Agent, or Firm*—Darby & Darby PC; John W. Branch

(57) ABSTRACT

Methods, systems, and apparatus, including computer program products, for a rental service through a computer network. A collection of virtual containers is assigned to a set of users including one or more users. Each virtual container in the collection is configured to identify one or more software products that are rented by users in the set. A user in the set is authorized to access a software product through the computer network based on whether the software product is identified as a rented software product in one or more virtual containers of the collection assigned to the set of users.

84 Claims, 9 Drawing Sheets

What You Need - Details

This is a list of details of what your need to play compared to your computer

Software

| Status | Component | Minimum | Recommended | Detected |
|---|---|---|---|---|
| ○ | Direct X | 8.0 | 8.0 | 8.0 |

Hardware

| Status | Component | Minimum | Recommended | Detected |
|---|---|---|---|---|
| ○ | Operating System | 0 | 0 | 0 |
| ○ | Processor Speed | 300 MHz | 400 MHz | 700 MHz |
| ○ | Memory | 64 MB | 128 MB | 192 MB |
| ○ | Sound Card | yes | yes | yes |
| ○ | 3D Video Card | yes | yes | yes |

Fig. 4

Welcome, danbhart

Home - Yahoo! - Help

YAHOO! GAMES ON DEMAND

My Games - All Games List - Account Info - Sign Out

Yahoo! Games On Demand

Broadband Connection Required To Play

Most Recently Played

- Grand Theft Auto 2
  Time Left: 15d:6h:5m
  ▶ PLAY NOW!

- Serious Sam
  Time Left: 18d:16h:1m
  ▶ PLAY NOW!

- Monopoly
  Time Left: 17d:16h:24m
  ▶ PLAY NOW!

- Atari Arcade
  Time Left: 17d:16h:5m
  ▶ PLAY NOW!

My Games

Browse Game Genres

Action
Adventure
Arcade/Family
Role-playing
Simulation

List of Games

Sort By: Most Popular | Release Date | Title : A-E | E-I | K-O | P-T | U-Z
Showing 1-10 out of 38    < Previous | Next >

---

4X4 EVO
ESRB rating: E
Off-road madness - pilot your 4X4 to victory!

Requires 1 Slot
Release Date: 10/1/2000
(You have 8 game slots open) ▶ PLAY NOW!

---

Addiction Pinball
ESRB rating: E
Addiction Pinball takes the thrill of the arcades and brings it to your PC!

Requires 1 Slot
Release Date: 4/30/1998
(You have 8 game slots open) ▶ PLAY NOW!

---

Age Of Wonders
ESRB rating: E
A brilliant combination of strategy, adventure and role-playing in a fantasy setting.

Requires 1 Slot
Release Date: 11/1/1999
(You have 8 game slots open) ▶ PLAY NOW!

---

Alone In The Dark: The New Nightmare
ESRB rating: M
Alone in the Dark immerses you in a dark and strange atmosphere where conventional rules do not apply.

Requires 1 Slot
Release Date: 6/1/2001
(You have 8 game slots open) ▶ PLAY NOW!

Fig. 5

YAHOO! GAMES ON DEMAND

Home - Yahoo - Help

Welcome, danibhart

My Games - All Games List - Account Info - Sign Out

Broadband Connection Required To Play

Yahoo! Games On Demand

You can play Deus Ex through the following different options:

(10) Use an open Slot - good for 30 days
Put this game in an open slot as part of your existing 10 game subscription package and play for 30 days.

(1) Single Game Rental - $4.95 for 3 days
Select this option if you'd like to play this game for 3 days.

Not sure what these are? See our help section or take our tour to find out more!

Copyright © 2002 Yahoo! Inc. All rights reserved.
Privacy Policy - Terms of Service - Guidelines
Questions, Comments, Bugs

Fig. 7

YAHOO! GAMES ON DEMAND

Home - Yahoo! - Help

Welcome, danbhart

My Games - All Games List - Account Info - Sign Out

Yahoo! Games On Demand

Broadband Connection Required To Play

Maximize your gaming experience by subscribing to a Game Package!

With a monthly fee, you can subscribe to any of our 3 Game Packages below that suits your gaming needs. You can customize your subscription through the use of Game Slots. It's all up to you!

Choose From these 3 Great Packages:

(10) 10 Games Package
- Unlimited play of 10 games each month.
- Customize which 10 games you want to play every month.

Only 14.95/month!

You Have This Package!

(5) 5 Games Package
- Unlimited play of 5 games each month.
- Customize which 5 games you want to play every month.

Only 12.95/month!

(3) 3 Games Package
- Unlimited play of 3 games each month.
- Customize which 3 games you want to play every month.

Only 9.95/month!

How Game Slots work:

Game Slots are designed so that you can customize your Game Package and your gaming experience. When you subscribe to a Game Package, you will be given a number of Game Slots, depending on which Game Package you chose.

ON-LINE SOFTWARE RENTAL

CLAIM OF PRIORITY

This application claims priority under 35 USC §119(e) to U.S. patent application Serial No. 60/411,279, filed on Sep. 16, 2002, the entire content of which is hereby incorporated by reference.

BACKGROUND

The present invention relates to distributing software.

The Internet is a global network of computers that uses a common communication protocol, the Transfer Control Protocol/Intern Protocol ("TCP/IP"), to transmit data from one location to another. High speed connections, such as broadband connections, allow a user on the Internet to interact with another user or service provider without long interruptions even if the interaction requires the transmission of a large amount of data. For example, a user on the Internet can play a computer game on-line, i.e., while being connected to a server on which a portion of the game's software is running. Typically before playing the game, one or more computer programs or program portions are downloaded to a client computer of the user. The client computer can install the downloaded computer programs (or portions thereof) to play the game. While the game is running, the client computer communicates with the server, e.g., receives data from the server depending on user input and the current or future state of the game.

In addition to playing games on-line, consumers can purchase game software from brick-and-mortar computer software retailers or Internet retailers. The purchased software can then be installed and used on one or more computing systems.

SUMMARY

A server in a computer network uses virtual containers assigned to a user to authorize on-line access through the network to software, e.g., game software, rented by the user. In general in one aspect, the invention provides methods and apparatus, including computer program products, for providing rental service through a computer network. A collection of virtual containers is assigned to a set of users including one or more users. Each virtual container in the collection is configured to identify one or more software products that are rented by users in the set. A user in the set is authorized to access a software product through the computer network based on whether the software product is identified as a rented software product in one or more virtual containers of the collection assigned to the set of users.

Particular implementations can include one or more of the following features. The rented software product can be identified in the virtual container for a rental period. The rented software product can be removed from the virtual container at the end of the rental period. A user subscription can be received from a user in the set of users for renting software products, and the collection of virtual containers can be assigned according to the user subscription. Assigning the collection of virtual containers according to the user subscription can include assigning a predetermined number of virtual containers for a subscription period. The assignment of the collection of virtual containers can be cancelled at the end of the subscription period. The computer network can include the Internet. The rented software product can include game, educational, or business software, or electronic media content.

Information can be acquired about a client system connected to the computer network for using the rented software product, and access can be authorized in accordance with the acquired information. Authorizing access in accordance with the acquired information can include denying access to the rented software product. Acquiring information about the client system can include determining whether the client system includes one or more personal computers and digital game devices. If authorized, access can be provided for the user in the set to use the rented software product such that a client portion of the rented software product runs in the client system while the user in the set uses the software product through the computer network. The client portion of the rented software product can be determined based on the acquired information about the client system. Acquiring information about the client system can include acquiring information describing a connection speed of the client device through the computer network.

A user interface can be provided for renting software products. In the user interface, user input can be received. The received user input can select a software product and place the selected software product in a virtual container of the assigned collection to be identified as rented software product. A software list can be presented in the user interface. The software list can include one or more items, where each item represents a software product for rent. User input selecting one or more items in the list can be received. Receiving user input selecting one or more items in the software list can include receiving user input selecting one or more items in the software list based on one or more of genre, title, manufacturer, and system requirements. Presenting a software list can include presenting a software list based on one or more of alphabetical order of title, release date, and popularity of software products for rent. Presenting a software list can include presenting a software list based on a user profile.

Assigning a collection of virtual containers to the set of users can include assigning one or more virtual containers for rentals having high priority, variable rental period, or limited content. Assigning a collection of virtual containers to the set of users can include assigning a limited access virtual container that one or more users in the set of users cannot use to access software product, or a multi-player virtual container to be associated with multi-player games.

A software product identified in a virtual container in the assigned collection can be offered for sale. Offering for sale a software product can include offering a sale coupon for the software product or an option for downloading the software product through the computer network. The number of virtual containers in the assigned collection can be increased. Increasing the number of virtual containers can include increasing the number of virtual containers if the users in the set earned a bonus for using the rented software product.

In general, in another aspect, the invention provides methods and apparatus, including computer program products, for renting software on-line. The method includes selecting one or more software products that are available for rent from an on-line rental service through a computer network, and subscribing to a package offered by the on-line rental service. The package assigns a collection of virtual containers to one or more users. The selected software products are placed in one or more virtual containers in the collection to identify the selected software products as software products rented by the assigned users. A user is allowed to access a software product if the software product is identified as a rented software product in a virtual container in the collection assigned to the user.

Particular implementations can include one or more of the following features. Authorization can be received from the on-line rental service to access the rented software product. Selecting one or more software products can include selecting a software game. Allowing a user to access a software product can include allowing the user to play the selected software game.

In general, in another aspect, the invention provides methods and apparatus, including computer program products, for providing rental service through a computer network. A subscription for a user is received. A collection of virtual containers is assigned to the user according to the received subscription. Each virtual container in the collection is configured to identify one or more software products rented by the user. User input is received that selects one or more software products to be identified as rented software products in one or more virtual containers in the collection assigned to the user. The user is authorized to access a software product through the computer network if the software product is identified as a rented software product in one or more virtual containers of the collection assigned to the user.

In general, in another aspect, the invention provides a server system for renting software products through a computer network. The server system includes a rental manager configured to assign a collection of virtual containers to a set of users including one or more users. Each virtual container in the collection is configured to identify one or more software products that are rented by users in the set. The rental manager is further configured to authorize users in the set to access a software product through the computer network based on whether the software product is identified as a rented software product in one or more virtual containers of the collection assigned to the set of users.

Particular implementations can include one or more of the following features. The software products can include software games. The server system can include an application engine configured to allow one or more users to play one or more software games if access to the software games is authorized by the rental manager. The server system can include a selection tool configured to select one or more software products for rent. The selection tool can be further configured to select a user subscription from a plurality of subscription models. The selection tool can be further configured to select from a plurality of purchase options. The server system can include a system checking tool configured to determine whether a client system used by one or more of the users in the set is suitable for renting software products available from the server system. The server system can include a payment manager configured to manage and record payments received for renting the software products.

The invention can be potentially implemented to realize one or more of the following advantages. A server on a computer network, e.g., the Internet, can provide a software rental service to users of the network. For example, the users can rent and play game software on-line. The rental service can provide single game rentals and/or subscriptions to the users. A user can subscribe to a package including a predetermined number of games that can be played an unlimited number of times for a rental period. Subscribed users can have one or more exclusively assigned virtual containers (e.g., slots) that identify software (e.g., game software) rented by the users. The users can select a game for each slot. The slots can include special slots corresponding to software rentals with limited content and/or limited access. For example, a special slot can be dedicated to renting games with one or more particular ratings or genre, and/or can be accessed only by particular users (e.g., above a certain age). One type of slot can allow the users to join a game that involves multiple players. Alternatively or in addition, one or more slots can have a variable rental period and/or an assigned priority, e.g., a high priority for renting most recent games. The users can optionally purchase the rented software.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 4-9 illustrate exemplary screen shots in a user interface for renting game software on-line.

Like reference numbers and designations in the various drawings indicate like elements.

DETAILED DESCRIPTION

Figure 1A:
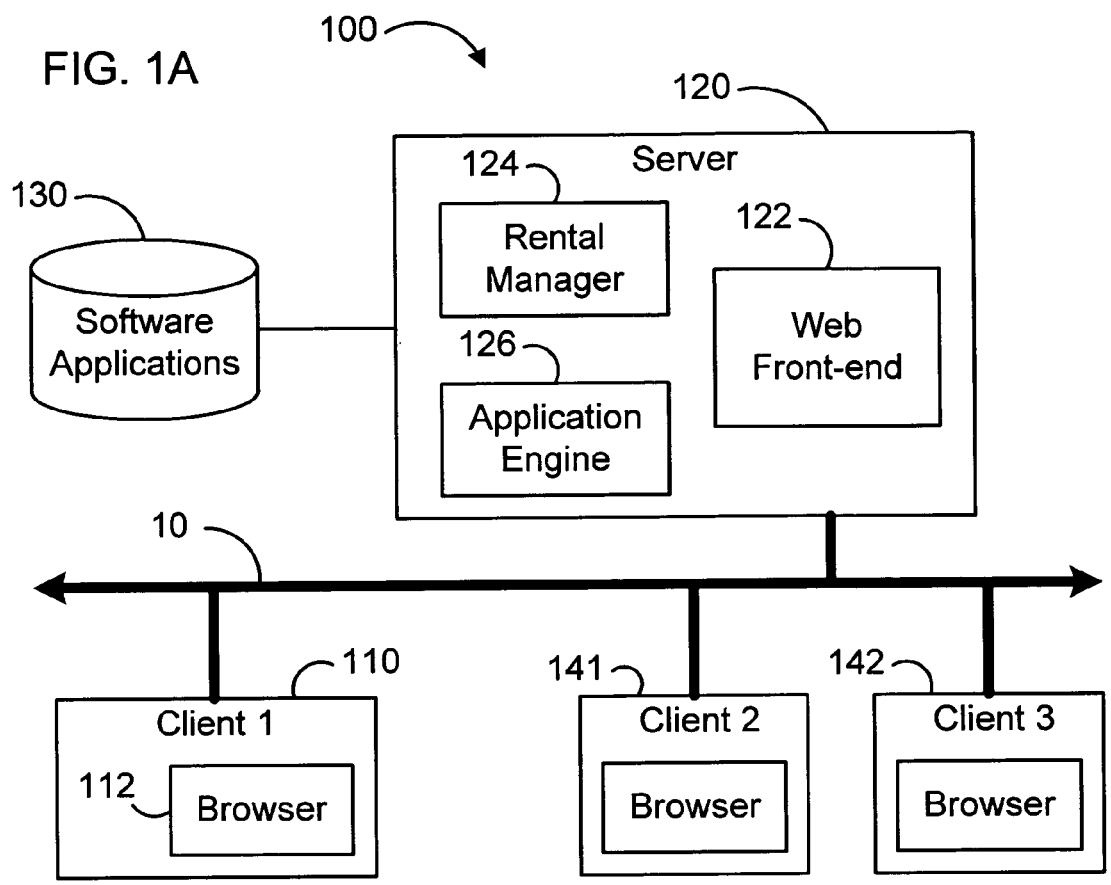
FIGS. 1A and 1B are schematic diagrams illustrating a system for renting software on-line.

FIG. 1A illustrates a system 100 that allows users in a network 10 to rent software, such as games, on-line. System 100 includes a first client 110, a server 120, and a data storage 130. A user interacts with client 110 that is connected to server 120 through network 10. System 100 also includes a second client 141 and a third client 142 that can connect to server 120 through network 10. In alternative implementations, the system can include any number of clients.

Server 120 has access to data storage 130 that stores software applications for rent and, optionally, corresponding documentation. In one implementation, data storage 130 stores software applications for computer games and server 120 rents the games on-line. Although system 100 is described below in detail for renting games on-line, in alternative implementations, system 100 can be used to rent any other software products. For example, system 100 can be used to rent educational or business software applications, or media or other electronic content.

Network 10 can be a public network, such as the Internet, in which data is passed over public communication links. Alternatively, network 10 can be a private network, such as a local area network ("LAN"), or can include a combination of public and private networks. For example, two or more LANs can be coupled using the Internet. In a private network, software can be rented to users who have access to that network.

Client 110 is a set of programs running in a client computer system, and among other functions, requests services from the server 120. The client system can include one or more personal computers and/or one or more digital game devices, such as a Microsoft® X-box or a Sony Playstation®. Client 110 can interact with server 120 to rent and play games on-line over network 10. For example, client 110 can request game renting and playing services for the user, i.e., the player. Typically there are other clients, e.g., clients 141 and/or 142, using server 120 to request game services for other players in network 10.

Client 110 includes a browser application 112 and a launcher application (not shown). Browser application 112, once invoked, allows the user of client 110 to interact with other applications or services over network 10. The launcher application can be downloaded, e.g., from server 120, before playing a game, and allows client 110 to interpret data streams received from server 120 during the playing of a game.

Server 120 can be implemented in a computer program that provides services to clients and typically runs on one or more server computers. Server 120 includes a web front-end 122, a rental manager 124, and an application engine 126. Web front-end 122 provides a customized view to communicate with a user in order to rent and/or play games. Rental manager 124 provides a rental service that allows users to rent games over network 10, as further discussed with reference to FIG. 11B. Application engine 126 provides a playing service that allows users to play the rented games. In one implementation, application engine 126 runs computer programs or program portions of a rented game when a user is playing. Alternatively or in addition, application engine 126 can connect through network 10 to one or more other servers that can run programs or program portions of a game. In one implementation, server 120 includes only rental manager 124 to provide a rental service and a corresponding playing service is provided by one or more other servers in network 10.

Figure 1B:
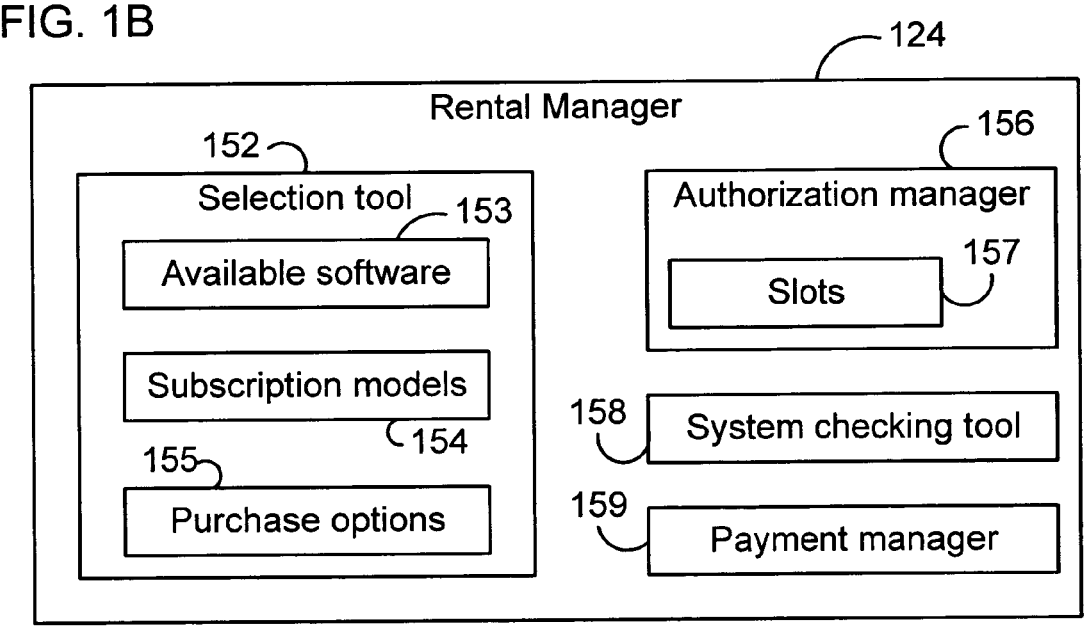

FIG. 1B illustrates an implementation of rental manager 124. In this implementation, rental manager 124 includes a selection tool 152, an authorization manager 156, a system checking tool 158, and a payment manager 159. Selection tool 152 allows users to select one or more games and offers the user options to rent or purchase the selected games. Authorization manager 156 assigns slots 157 to users, where each slot is a virtual container configured to identify one or more games that are rented by the corresponding user. Authorization manager 156 authorizes a user to play a game if the game is identified in a slot assigned to the user, as further discussed with reference to FIG. 3. System checking tool 158 can determine whether a client system is suitable to play one or more particular games, as further discussed with reference to FIG. 2. Payment manager 159 manages and records payments for the rentals and purchases of the users.

Selection tool 152 specifies available game software 153, subscription models 154, and purchase options 155. Available game software 153 specifies games from which users can select one or more games to rent or purchase. Available game software 153 can specify games that are or will be available from server 120 (or optionally, from other servers in network 10). Selection tool 152 can also include or point to information about available game software 153, as further discussed with reference to FIG. 2. Based on available game software 153, selection tool 152 can present one or more game lists to a user and receive a user selection of one or more games from the game lists. In addition to selecting games, selection tool 152 allows a user to select from multiple options to rent the selected games. For example, the user can select from a variety of subscription services specified by subscription models 154, as further discussed with reference to FIG. 3. Selection tool 152 can also offer the user the selected games for purchasing as specified by purchase options 155, and receive a user selection of one or more of purchase options 155.

In addition to subscriptions, selection tool 152 can also offer single game rental (not shown in FIG. 1B). When a single game rental is desired, a user specifies a particular game and is charged a pre-determined rental price, e.g., 4.95 USD. For the rental price, the user is authorized to play a selected game, e.g., over network 10, for a predetermined time period, typically a few (such as one to three) days depending on parameters associated with the single game rental. Alternatively or in addition, the user may be limited to a predetermined time of actual playing.

Figure 2:
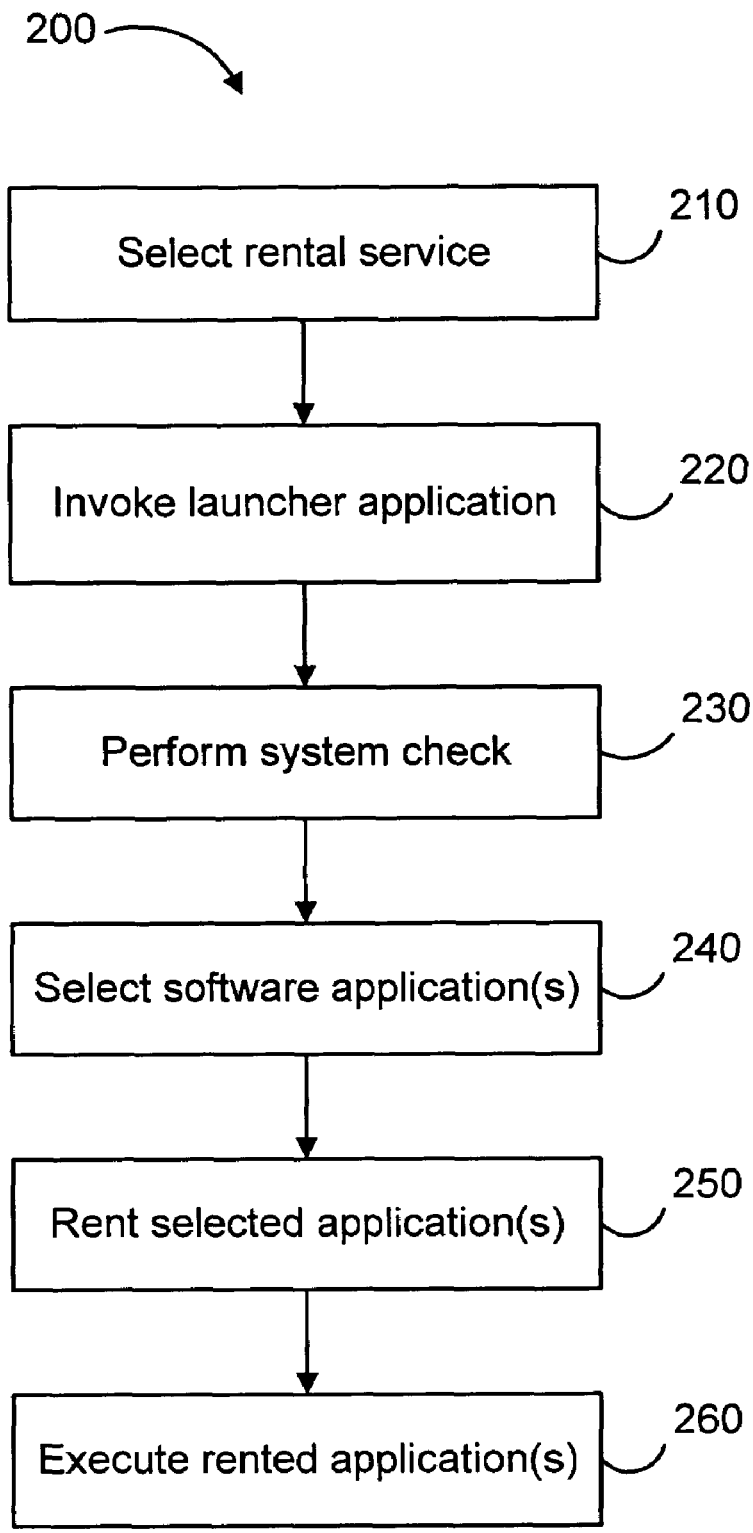
FIGS. 2 and 3 are flowcharts illustrating methods for renting software on-line.

FIG. 2 illustrates a method 200 for renting software, e.g., one or more games, on-line. Method 200 can be performed in system 100 (FIG. 1A) or in other systems that allow users to rent software, such as games, on-line in a computer network. A user selects a rental service (step 210). To select the rental service, the user can view, for example, a web page received from server 120 through network 10. In one implementation, the web page is a dynamic web page generated by web front-end 122 and includes navigational tools to view details in a description of the rental service. Alternatively, the user can receive electronic or traditional mail including the description of the rental service.

After selecting a rental service, a corresponding launcher application is invoked in a client computer of the user (step 220). The launcher application allows the client computer to interpret data received from a corresponding server, e.g., to play a game. The launcher application and data for the game can be downloaded, e.g., from server 120 (FIG. 1A), and the downloaded launcher application can be installed in the client computer. Alternatively or in addition, the launcher application can be available from other sources, e.g., on compact disks related to the selected rental service. Optionally, the launcher application can be updated before being invoked. In alternative implementations, the launcher application can be invoked when the user selects to view a game demonstration, subscribes to a game package, rents a game, or when the server performs a system check on a client, as described below.

Next, the client system is checked to determine software and/or hardware environment of the client (step 230). A result of the check can be used to verify whether the client satisfies system requirements for using the rental service, e.g., renting and/or playing games on-line. In one implementation, rental manager 124 performs a main system check on the client system. The main system check verifies whether the client system satisfies basic requirements for the rental service. The basic system requirements can include one or more of the following requirements: speed requirements, e.g., broadband connection; operating system requirements, e.g., Windows 95 or above; processor requirements, e.g., Pentium processor running on a frequency 233 MHz or faster; memory requirements, e.g., 64 MB RAM or more; available magnetic storage space, e.g., 500 MB or more; sound card; video card; browser, launcher or other applications, e.g., Microsoft Direct X, that are used for playing games. Optionally, the server can check whether the client system includes personal computers or game devices, such as a Playstation® or an X-box®. Furthermore, the server can measure the speed of the high speed connection.

Optionally, a system check can be initiated by the user any time, or automatically, for example, by rental manager 124 before renting, or by application engine 126 before starting play of a game. When a system check is performed before renting or playing a game, the system check can compare results of the system check to the system requirements of the game. In one implementation, the comparison is used to decide which (and how much) data needs to be downloaded to the client before or during play of the game.

Server 120 can inform the user about the result of the system check by sending the client a system check record. An exemplary system check record is shown in FIG. 4. If the basic system requirements are not met by the client system, rental manager 124 can ask the user to upgrade one or more features of the client system before using the rental service. Alternatively, rental manager 124 can present to the user a limited selection of games. The limited selection can include only games that can be played in the present software and/or hardware environment of the client system. Optionally, subscription fees can be adjusted when only a limited selection is available to the user.

The user selects one or more game software applications for renting (step 240). To select games, web front end 122 provides a user interface for the user through network 10, and rental manager 124 provides one or more game lists based on available game software 153. A game list can include all available game software applications, or can be a selection from the available games based on user input and/or some predefined criteria. The selection can be based on categories or genre, such as action, adventure, arcade, role-playing, simulation, sports, and strategy. Alternatively, the selection can be based on a publisher, a manufacturer, or a rating. The rating can include evaluations of quality and/or content, or can be based on age recommended for players of the game. In one implementation, the selection includes games that can be played on a given client system.

The game list can be sorted based on one or more sorting features. The sorting features can include, e.g., alphabetical order of game titles, release date, or one or more statistical measures, i.e., characteristics based on statistical evaluation of data related to the game. Statistical measures can be calculated for a game, e.g., by rental manager 124, and can include "popularity" reflecting the number of players renting the game over a specified time period. Furthermore, a game list can be selected and sorted based on one or more search parameters, such as words in a game title. Sorting can be performed by linking various sorting features, so that combinations of criteria can be used to present selections to the user.

Optionally, the game list can include renting information, such as a number of slots required to rent a game in the list, and present or future availability of games. For example, the game list can include games that will be available in a near future. Furthermore, the game list can indicate if a game will be removed from the rental service, i.e., it will not be available for rental after some time in the future. The game list can also show a number of slots that are currently available to the user for renting a game. An exemplary game list is shown in FIG. 5.

In alternative implementations, rental manager 124 can provide a game list including games recommended based on a personal profile of a player. If one or more of the slots 157 has been already assigned to the player, the game list can include the same number of recommended games as the number of available, i.e., empty, slots. In one implementation, recommended games can be presented in the empty slots. Alternatively, the empty slots can include information to help select a next game for renting. For example, the empty slots can present screens from recently added games.

Figure 6:
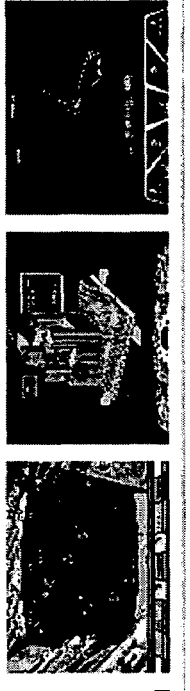

Optionally, the user can pre-select one or more games in the game list to obtain a product page that provides detailed information about the pre-selected games. The product page can include one or more of the following features: a size of the code that needs to be downloaded to play the game; a corresponding estimate for a downloading time; a short and/or long description of the game; a game manual; frequently asked questions about the game; rating information; screens from the game; marketing information; navigation tools to access similar games in the rental service; and addresses to access a publisher or a manufacturer of the game, discussion groups, or other Internet sites that contain relevant information about the game. An exemplary product page is shown in FIG. 6.

After selecting one or more game software applications, the user rents the selected game software applications (step 250). In one implementation, the user can select a single game rental or subscribe to the rental service according to one of subscription models 154. For example, the user can subscribe to have a number of assigned slots, as discussed with reference to FIG. 3. If the user has already subscribed and has one or more assigned slots, the user can use an empty slot if available, or choose a single game rental as shown in the exemplary screen shot in FIG. 7.

The user executes one or more of the rented applications (step 260). For example, the user can play a game on-line or off-line. Authorization manager 156 can authorize playing the rented games, and if authorized, application engine 126 can provide programs that allow the user to play the game. For on-line playing, the application engine 126 can execute corresponding programs or program portions while the user plays the game. In alternative implementations, after the authorization, rental manager 124 can direct the user to another server that provides playing service for games upon authorization from rental manager 124.

Figure 3:
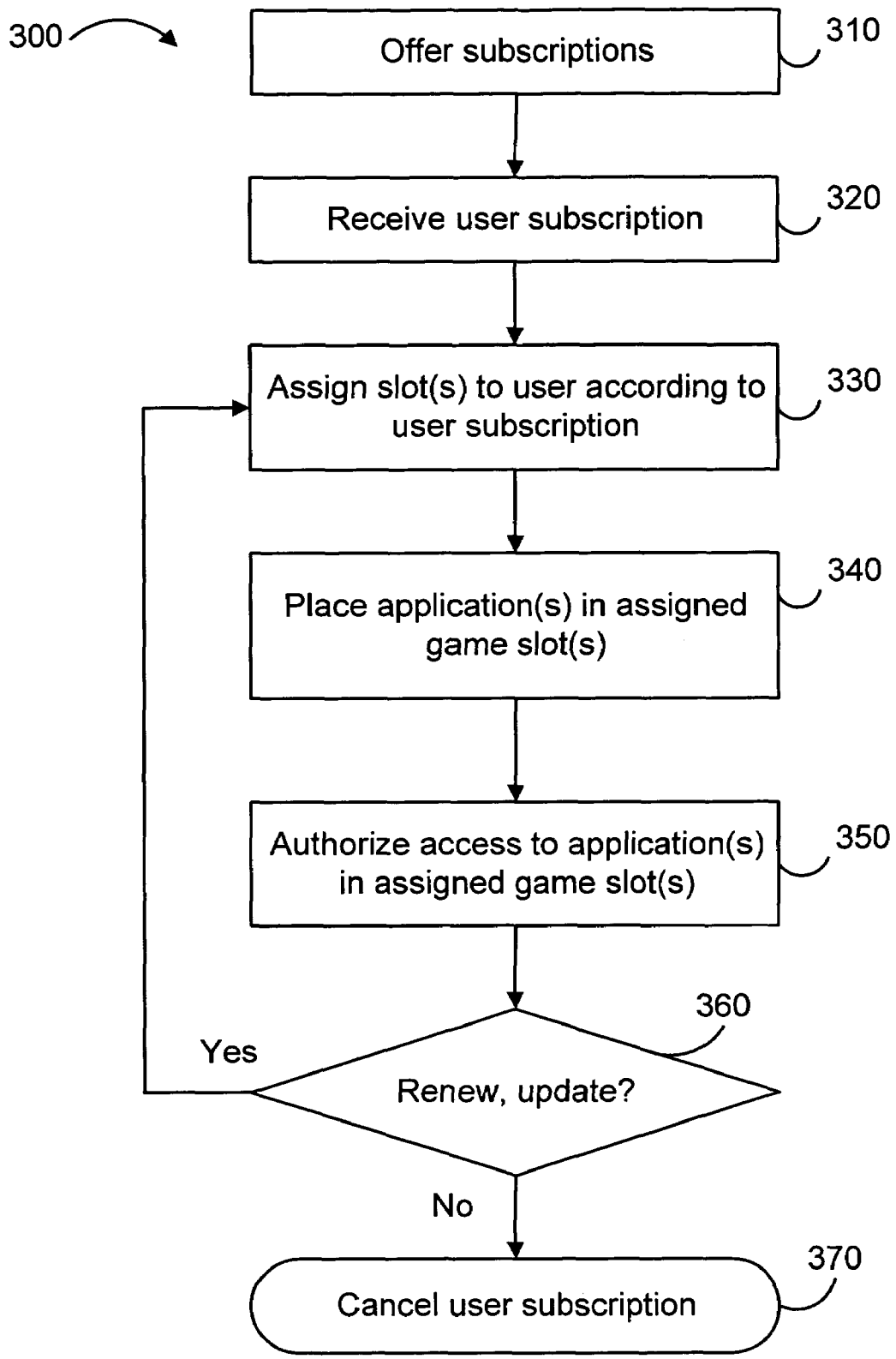

FIG. 3 illustrates a method 300 for implementing a subscription service for software rentals. Method 300 can be performed using server 120 in system 100 (FIG. 1A), or by other servers in systems that allow users in a computer network to rent software, e.g., games, on-line. Server 120 offers subscriptions to the user according to subscription models 154 (step 310). Alternatively, subscriptions can be offered by electronic or traditional mail, or by telephone. In one implementation, subscription models 154 can offer game packages, where each game package specifies a number of games, e.g., three, five, or ten games. When subscribing to a game package, the user can select the specified number of games and play any of the selected games for a rental period, e.g., a month. In one implementation, a rental period for a game package is substantially longer than a rental period for single game rental. FIG. 8 shows an exemplary offer including three-game, five-game, and ten-game packages.

Server 120 receives a user subscription (step 320), e.g., through network 10. Alternatively, an operator can enter the user subscription into server 120, or otherwise provide server 10 with information about the user subscription. In one implementation, the user can subscribe for a game package at any time. For example, the user can provide an authorization to payment manager 159 for charging a subscription fee on a credit card. Alternatively, the user can choose other methods of payment, such as a money order or a personal check, and an operator can enter information about the payment into server 120 so that payment manager 159 can record the payment.

Figure 9:
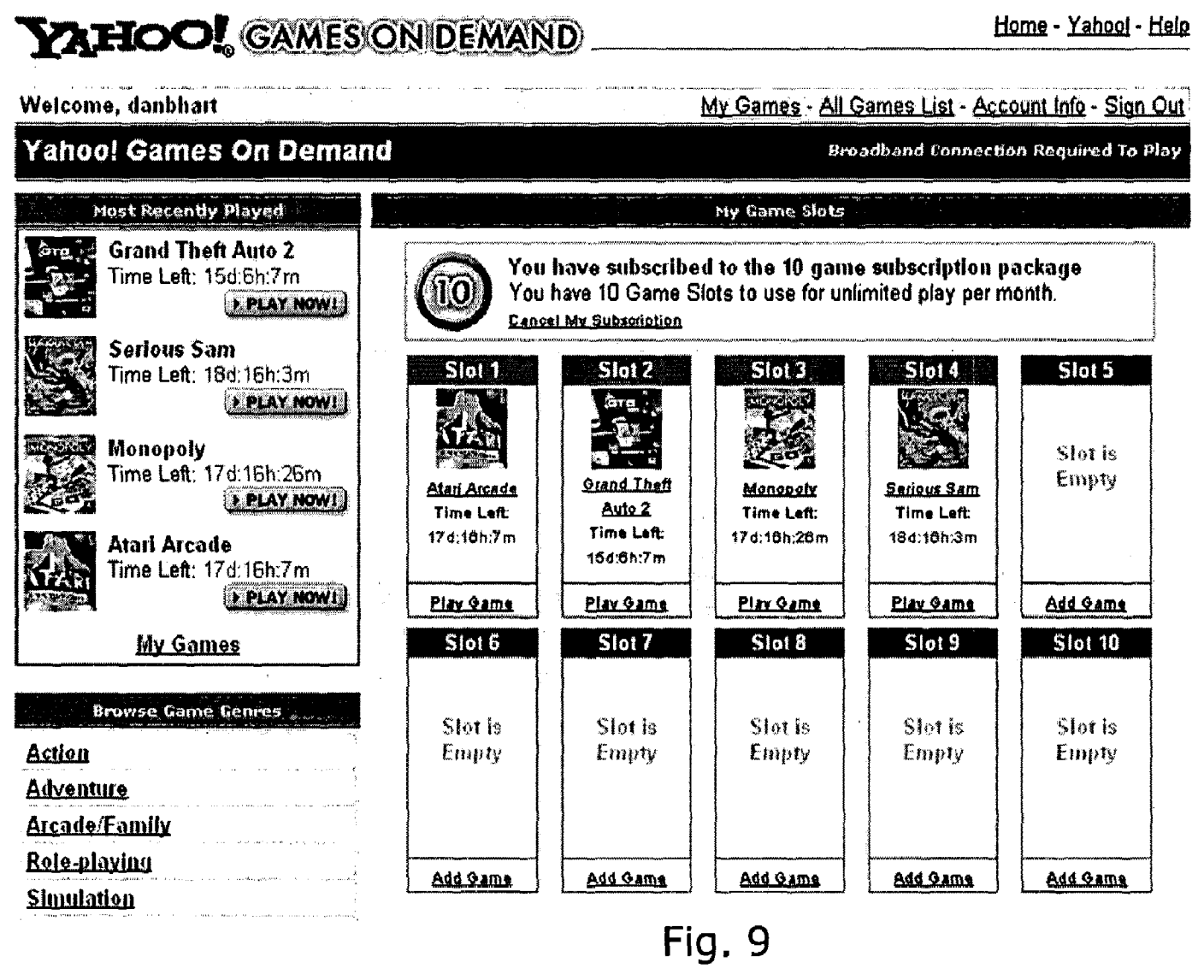

To implement the received user subscription corresponding to a game package, server 120 assigns a set of slots to the user according to the game package (step 330). For example, an n-game package can be implemented by assigning to the user a set that includes n slots. A slot is a virtual container for identifying games that are rented by the user. That is, rented games are placed in slots (figuratively speaking). Typically, one slot identifies one rented game. Optionally, a slot can be configured to identify more than one rented game. For example, one slot can identify two rented games, e.g., games that have small or decreasing market values. Alternatively, renting a single game can require multiple slots to identify the same game, for example, if the game has a high market value or high demand. A ten-slot implementation is illustrated in FIG. 9.

In a user interface, server 120 receives user input for placing one or more game applications into the slots assigned to the user (step 340). For example, a user can drag, drop, select from a menu, or otherwise indicate which game belongs to which assigned slot. Games can be placed into a slot as long as a game package is active, i.e., the user has properly subscribed for a game package. Once a game is placed in a slot, the slot identifies the game as a game rented by the user.

The slot identifies the rented game for a rental period. In one implementation, the rental period has a pre-defined duration, such as thirty days, that starts when the game is placed in the slot. Alternatively, the rental period can start at a predefined time, such as the first day of each month. Furthermore, different slots can have different rental periods, or a rental period can be established based upon a market value of the game to be rented. Optionally, server 120 can indicate to the user a time for which the game remains in the slot. For example, the server can show a remaining time and/or an expiration date for each game in a slot assigned to the user.

Server 120 authorizes access to game applications that are identified in slots assigned to the user (step 350). Based on the authorization, server 120 or another server can provide playing service to play the games in the slots. While a game is in a slot, i.e., during the rental period, the user can play the game without any further restriction. If there is a problem with the game during the rental period, e.g., the game "freezes" or does not start properly, rental manager 124 (e.g., payment manager 159) can provide an automatic refund to the user (e.g., if the game selection is not compatible with the user's system).

Periodically, for example at the end of a rental or billing period, server 120 can renew or update the assigned set of slots based on user input and/or billing information provided, e.g., by payment manager 159 (decision 360). If the assigned set cannot be renewed or updated ("No" branch of decision 360), the user subscription is cancelled (step 370). If the assigned set is renewed or updated ("Yes" branch of decision 360), corresponding games slots are (re)assigned to the user (i.e., method 300 returns to step 330).

Typically, the user subscription is updated at the end of a billing period, e.g., each month, when a subscription fee is expected to be paid. In one implementation, the slots are automatically renewed. For example, the slots can be assigned to the user according to a self-renewing subscription service, assuming an appropriate payment is received, or until a cancellation request is received from the user. Typically, the user can cancel the subscription service at the end of a billing period. Alternatively, the user can subscribe for a subscription period, e.g., a year, and the subscription service can be cancelled at the end of the subscription period.

At an update, a user can upgrade or downgrade the assigned slots. In one implementation, a game package can be upgraded at any time by adding slots to the game package. In one implementation, the user cannot downgrade from a subscribed game package without canceling the package. Alternatively, a user may be permitted to cancel any rental, or any number of slots at a given time. In one implementation, the user may be required to pay a cancellation fee. In one implementation, by playing frequently, users can earn free slots or can receive a second game in an existing slot.

At the end of the rental period, a game is removed from a corresponding slot. Once empty, a new game can be placed in the slot. Optionally, the previous game in the slot can be renewed for a next rental period. In one implementation, the game cannot be removed from the slot before the end of the rental period. Alternatively, if the game is removed from the slot before the end of the rental period, the user can select a new game for the slot from a restricted set of games (i.e., the subscription service rents a particular number of slots not a particular number of games).

Optionally, the user can have a purchasing option for a rented game during or at the end of the rental period. The purchasing option can offer on-line buying of the rented game at a price. In one implementation, the user can immediately download the rented game at the time of the purchase. Alternatively, the user can receive a coupon for buying the rented game from a retailer. The coupon can identify the rental service that issued the coupon. If the coupon is used to purchase the game at a retailer, the retailer can send the coupon to a publisher of the game, so the publisher can identify the rental service that assisted in selling the game.

In alternative implementations, a set of slots can include one or more special slots. In one implementation, a special slot can have an assigned priority, e.g., corresponding to market value of games that can be placed in the special slot. For example, a game of high market value or high demand can be placed in a high priority slot. Alternatively, a high priority slot can provide an improved service from the server, e.g., by providing high resolution images or large bandwidth. In one implementation, a special slot can offer a variable rental period. Furthermore, a special slot can have an associated rating or category that can be used to limit games that can be placed in the special slot.

In one implementation, a group of users (e.g., a family) can share a set of slots. A shared set can include slots designated to different members of the group for exclusive use. A game in a designated slot can be accessed by a password held by the designated group member. Designated slots can have restrictions. For example, a slot designated to a child can identify only games that are rated to be appropriate for the child.

In one implementation, server 120 can implement subscriptions for multiple player games. For example, server 120 can install a special slot for games played by multiple players. By placing a multiple player game in such special slot, the user can be authorized to join the game. The multiple player game can be provided by server 120. Alternatively, another service provider on the Internet can provide the playing service for the multiple player game, and server 120 can provide only the rental service (e.g., server 120 can authorize users to join the game).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results. In alternative implementations, the techniques described to rent game software on-line can also be used to rent other software products, e.g., software applications, such as educational or business applications, or electronic content, such as media content or any other content for rent. In addition to renting, these techniques can be used, e.g., to license, give right to use, or authorize access to software products.

What is claimed is:

1. A method for providing on-line rental service for software, the method comprising:
    assigning a collection of virtual containers to a set of users including one or more users,
        wherein the collection is selected from a plurality of collections, each with a different quantity of virtual containers, and
        each virtual container in the collection being configured to identify one or more software products that are rented by users in the set, and
        the collection identifying a rental package of a predefined quantity of virtual containers at least one of which is configured to identify a plurality of the software products accessible to the set of users, and
        wherein at least one virtual container in the collection is assigned a virtual container priority level corresponding to a variable software product access level, and
        wherein at least one virtual container in the collection provides a different rental period duration from at least one other virtual container in the collection, and
        wherein at least one virtual container in the collection permits selectively removing a software product and adding a new software product before the end of a rental period associated with the at least one virtual container; and
    authorizing a user in the set to access a software product through a computer network based on whether the software product is identified as a rented software product in one or more virtual containers of the collection assigned to the set of users.

2. The method of claim 1, further comprising:
    identifying the rented software product in the virtual container for a rental period.

3. The method of claim 2, further comprising:
    removing the rented software product from the virtual container at the end of the rental period.

4. The method of claim 1, further comprising:
    receiving a user subscription from a user in the set of users for renting software products,
    wherein assigning a collection of virtual containers includes assigning the collection of virtual containers according to the user subscription.

5. The method of claim 4, wherein:
    assigning the collection of virtual containers according to the user subscription includes assigning a predetermined number of virtual containers for a subscription period.

6. The method of claim 5, further comprising:
    canceling the assignment of the collection of virtual containers at the end of the subscription period.

7. The method of claim 1, wherein the computer network includes the Internet.

8. The method of claim 1, wherein the rented software product includes game software.

9. The method of claim 1, wherein the rented software product includes educational or business software.

10. The method of claim 1, wherein the rented software product includes electronic media content.

11. The method of claim 1, further comprising:
    acquiring information about a client system connected to the computer network for using the rented software product,
    wherein authorizing access includes authorizing access in accordance with the acquired information.

12. The method of claim 11, wherein:
    authorizing access in accordance with the acquired information includes denying access to the rented software product.

13. The method of claim 11, wherein:
    acquiring information about the client system includes determining whether the client system includes one or more personal computers and digital game devices.

14. The method of claim 11, further comprising:
    if access is authorized, providing access for the user in the set to use the rented software product such that a client portion of the rented software product runs in the client system while the user in the set uses the software product through the computer network.

15. The method of claim 14, further comprising:
    determining the client portion of the rented software product based on the acquired information about the client system.

16. The method of claim 11, wherein:
    acquiring information about the client system comprises acquiring information describing a connection speed of the client device through the computer network.

17. The method of claim 1, further comprising:
    providing a user interface for renting software products.

18. The method of claim 17, further comprising:
    in the user interface, receiving user input selecting a software product and placing the selected software product in a virtual container of the assigned collection to be identified as rented software product.

19. The method of claim 17, further comprising:
    in the user interface, presenting a software list including one or more items, each item representing a software product for rent; and
    receiving user input selecting one or more items in the list.

20. The method of claim 19, wherein:
receiving user input selecting one or more items in the software list includes receiving user input selecting one or more items in the software list based on one or more of genre, title, manufacturer, and system requirements.

21. The method of claim 19, wherein:
presenting a software list includes presenting a software list based on one or more of alphabetical order of title, release date, and popularity of software products for rent.

22. The method of claim 19, wherein:
presenting a software list includes presenting a software list based on a user profile.

23. The method of claim 1, wherein:
assigning a collection of virtual containers to the set of users includes assigning one or more virtual containers for rentals having high priority.

24. The method of claim 1, wherein:
assigning a collection of virtual containers to the set of users includes assigning one or more virtual containers for rentals having variable rental period.

25. The method of claim 1, wherein:
assigning a collection of virtual containers to the set of users includes assigning one or more virtual containers for rentals with limited content.

26. The method of claim 1, wherein:
assigning a collection of virtual containers to the set of users includes assigning a limited access virtual container that one or more users in the set of users cannot use to access software product.

27. The method of claim 1, wherein:
assigning a collection of virtual containers to the set of users includes assigning a multi-player virtual container to be associated with multi-player games.

28. The method of claim 1, further comprising:
offering for sale a software product identified in a virtual container in the assigned collection.

29. The method of claim 28, wherein:
offering for sale a software product includes offering an option for downloading the software product through the computer network.

30. The method of claim 28, wherein:
offering for sale a software product includes offering a sale coupon for the software product.

31. The method of claim 1, further comprising:
increasing the number of virtual containers in the assigned collection.

32. The method of claim 31, wherein:
increasing the number of virtual containers includes increasing the number of virtual containers if the users in the set earned a bonus for using the rented software product.

33. A method for renting software on-line, the method comprising:
selecting one or more software products that are available for rent from an on-line rental service through a computer network;
subscribing to a package offered by the on-line rental service, the package assigning a collection of virtual containers to one or more users, wherein the package is selected from a plurality of packages, each assigning a different quantity of virtual containers, a virtual container in the collection being configured to identify a software product placed in the virtual container as being rented by the one or more users, wherein at least one virtual container in the collection is assigned a virtual container priority level corresponding to a variable software product access level;
associating the selected software products with one or more virtual containers in the collection to identify the selected software products as software products rented by the assigned users; and
allowing a user to access a software product if the software product is identified as a rented software product in a virtual container in the collection assigned to the user.

34. The method of claim 33, further comprising:
receiving authorization from the on-line rental service to access the rented software product.

35. The method of claim 33, wherein:
selecting one or more software products includes selecting a software game; and allowing a user to access a software product includes allowing the user to play the selected software game.

36. A method for providing rental service through a computer network, the method comprising:
receiving a subscription for a user;
assigning a collection of virtual containers to the user according to the received subscription, wherein each virtual container in the collection is configured to identify one or more software products rented by the user;
receiving user input selecting one or more software products to be identified as rented software products in one or more virtual containers in the collection assigned to the user;
authorizing the user to access a first software product through the computer network if the first software product is identified as a rented software product in one or more virtual containers of the collection assigned to the user; and
authorizing the user to access a second software product through the computer network for a different rental period duration from that of the first software product, if the second software product is identified as a rented software product in another one or more virtual containers of the collection assigned to the user.

37. A server system for renting software products through a computer network, the server system comprising:
a rental manager configured to assign a collection of virtual containers to a set of users including one or more users, wherein the collection is selected from a plurality of collections, each with a different quantity of virtual containers, and wherein each virtual container in the collection is configured to identify one or more software products that are rented by users in the set, and the rental manager assigns to at least one virtual container in the collection a different virtual container priority level from that of another virtual container, wherein each virtual container priority level corresponds to a variable software product access level, the rental manager further configured to authorize users in the set to access a software product through the computer network based on whether the software product is identified as a rented software product in one or more virtual containers of the collection assigned to the set of users.

38. The server system of claim 37, wherein the software products include a plurality of software games, the server system further comprising:
an application engine configured to allow one or more users to play one or more software games in the plurality of software games if access to the one or more software games is authorized by the rental manager.

39. The server system of claim 37, further comprising:
a selection tool configured to select one or more software products for rent.

40. The server system of claim 38, wherein:
the selection tool is further configured to select a user subscription from a plurality of subscription models.

41. The server system of claim 38, wherein:
the selection tool is further configured to select from a plurality of purchase options.

42. The server system of claim 37, further comprising:
a system checking tool configured to determine whether a client system used by one or more of the users in the set is suitable for renting software products available from the server system.

43. The server system of claim 37, further comprising:
a payment manager configured to manage and record payments received for renting the software products.

44. A software product, tangibly embodied in a machine-readable medium, for providing rental service through a computer network, the software product comprising instructions operable to cause one or more data processing apparatus to perform operations comprising:
assigning a collection of virtual containers to a set of users including one or more users, each virtual container in the collection being configured to identify one or more software products that are rented by users in the set, and the collection identifying a rental package of a predefined quantity of virtual containers each of which is configured to identify the one or more software products accessible to the set of users, wherein at least one virtual container in the collection provides a different rental period duration from at least one other virtual container in the collection, and wherein at least one virtual container in the collection permits selectively removing a software product and adding a new software product before the end of a rental period associated with the at least one virtual container; and
authorizing a user in the set to access a software product through the computer network based on whether the software product is identified as a rented software product in one or more virtual containers of the collection assigned to the set of users.

45. The software product of claim 44, further comprising instructions operable to cause one or more data processing apparatus to perform operations comprising:
identifying the rented software product in the virtual container for a rental period.

46. The software product of claim 45, further comprising instructions operable to cause one or more data processing apparatus to perform operations comprising:
removing the rented software product from the virtual container at the end of the rental period.

47. The software product of claim 44, further comprising instructions operable to cause one or more data processing apparatus to perform operations comprising:
receiving a user subscription from a user in the set of users for renting software products,
wherein assigning a collection of virtual containers includes assigning the collection of virtual containers according to the user subscription.

48. The software product of claim 47, wherein:
assigning the collection of virtual containers according to the user subscription includes assigning a predetermined number of virtual containers for a subscription period.

49. The software product of claim 48, further comprising instructions operable to cause one or more data processing apparatus to perform operations comprising:
canceling the assignment of the collection of virtual containers at the end of the subscription period.

50. The software product of claim 44, wherein the computer network includes the Internet.

51. The software product of claim 44, wherein the rented software product includes game software.

52. The software product of claim 44, wherein the rented software product includes educational or business software.

53. The software product of claim 44, wherein the rented software product includes electronic media content.

54. The software product of claim 44, further comprising instructions operable to cause one or more data processing apparatus to perform operations comprising:
acquiring information about a client system connected to the computer network for using the rented software product,
wherein authorizing access includes authorizing access in accordance with the acquired information.

55. The software product of claim 54, wherein:
authorizing access in accordance with the acquired information includes denying access to the rented software product.

56. The software product of claim 54, wherein:
acquiring information about the client system includes determining whether the client system includes one or more personal computers and digital game devices.

57. The software product of claim 54, further comprising instructions operable to cause one or more data processing apparatus to perform operations comprising:
if access is authorized, providing access for the user in the set to use the rented software product such that a client portion of the rented software product runs in the client system while the user in the set uses the software product through the computer network.

58. The software product of claim 57, further comprising:
determining the client portion of the rented software product based on the acquired information about the client system.

59. The software product of claim 54, wherein:
acquiring information about the client system comprises acquiring information describing a connection speed of the client device through the computer network.

60. The software product of claim 44, further comprising instructions operable to cause one or more data processing apparatus to perform operations comprising:
providing a user interface for renting software products.

61. The software product of claim 60, further comprising instructions operable to cause one or more data processing apparatus to perform operations comprising:
in the user interface, receiving user input selecting a software product and placing the selected software product in a virtual container of the assigned collection to be identified as rented software product.

62. The software product of claim 60, further comprising instructions operable to cause one or more data processing apparatus to perform operations comprising:
in the user interface, presenting a software list including one or more items, each item representing a software product for rent; and
receiving user input selecting one or more items in the list.

63. The software product of claim 62, wherein:
receiving user input selecting one or more items in the software list includes receiving user input selecting one or more items in the software list based on one or more of genre, title, manufacturer, and system requirements.

64. The software product of claim 62, wherein:
presenting a software list includes presenting a software list based on one or more of alphabetical order of title, release date, and popularity of software products for rent.

65. The software product of claim 62, wherein:
presenting a software list includes presenting a software list based on a user profile.

66. The software product of claim 44, wherein:
assigning a collection of virtual containers to the set of users includes assigning one or more virtual containers for rentals having high priority.

67. The software product of claim 44, wherein:
assigning a collection of virtual containers to the set of users includes assigning one or more virtual containers for rentals having variable rental period.

68. The software product of claim 44, wherein:
assigning a collection of virtual containers to the set of users includes assigning one or more virtual containers for rentals with limited content.

69. The software product of claim 44, wherein:
assigning a collection of virtual containers to the set of users includes assigning a limited access virtual container that one or more users in the set of users cannot use to access software product.

70. The software product of claim 44, wherein:
assigning a collection of virtual containers to the set of users includes assigning a multi-player virtual container to be associated with multi-player games.

71. The software product of claim 44, further comprising instructions operable to cause one or more data processing apparatus to perform operations comprising:
offering for sale a software product identified in a virtual container in the assigned collection.

72. The software product of claim 71, wherein:
offering for sale a software product includes offering an option for downloading the software product through the computer network.

73. The software product of claim 71, wherein:
offering for sale a software product includes offering a sale coupon for the software product.

74. The software product of claim 44, further comprising instructions operable to cause one or more data processing apparatus to perform operations comprising:
increasing the number of virtual containers in the assigned collection.

75. The software product of claim 74, wherein:
increasing the number of virtual containers includes increasing the number of virtual containers if the users in the set earned a bonus for using the rented software product.

76. The product of claim 44, further comprising instructions to cause one or more data processing apparatus to perform operations comprising:
authorizing the user in the set to access the software product based on whether the software product was previously associated with the collection of virtual containers.

77. A software product, tangibly embodied in a machine-readable medium, for renting software on-line, the software product comprising instructions operable to cause one or more data processing apparatus to perform operations comprising:
selecting one or more software products that are available for rent from an on-line rental service through a computer network;
subscribing to a package offered by the on-line rental service, the package assigning a collection of virtual containers to one or more users, wherein the package is selected from a plurality of packages, each assigning a different quantity of virtual containers, and wherein at least one virtual container in the collection provides a different rental period duration from at least one other virtual container in the collection;
placing the selected software products in one or more virtual containers in the collection to identify the selected software products as software products rented by the assigned users; and
allowing a user to access a software product if the software product is identified as a rented software product in a virtual container in the collection assigned to the user.

78. The software product of claim 77, further comprising instructions operable to cause one or more data processing apparatus to perform operations comprising:
receiving authorization from the on-line rental service to access the rented software product.

79. The software product of claim 77, wherein:
selecting one or more software products includes selecting a software game; and
allowing a user to access a software product includes allowing the user to play the selected software game.

80. A software product, tangibly embodied in a machine-readable medium, for providing rental service through a computer network, the software product comprising instructions operable to cause one or more data processing apparatus to perform operations comprising:
receiving a subscription for a user;
assigning a collection of virtual containers to the user according to the received subscription, wherein each virtual container in the collection is configured to identify one or more software products rented by the user;
receiving user input selecting one or more software products to be identified as rented software products in one or more virtual containers in the collection assigned to the user, wherein at least one of the selected software products is identified by a virtual container priority level corresponding to a variable software product access level,; and
authorizing the user to access a software product through the computer network if the software product is identified as a rented software product in one or more virtual containers of the collection assigned to the user.

81. The method of claim 1, wherein:
authorizing the user in the set to access the software product includes authorizing based on whether the software product was previously associated with the collection of virtual containers.

82. A computer-implemented method for providing rental service, the method comprising:
assigning, in accordance with a user's subscription for rental service, one or more virtual containers to the user, a virtual container being configured to identify one of the following:
a plurality of software products associated with the virtual container as being rented by a user to whom the virtual container is assigned; and
a portion of a software product associated with the virtual container as being rented by a user to whom the virtual container is assigned;

receiving from the user a selection of one or more software products and, in response, associating the selected one or more software products with at least one of the one or more virtual containers assigned to the user; and in response to receiving a request for the user to access, through a computer network, a requested software product, determining whether the requested software product is identified, as being rented by the user, by any of the one or more virtual containers assigned to the user; and when the requested software product is determined to be identified as being rented by the user, authorizing the user to access the rented software product.

83. A computer-implemented method for providing a rental service, the method comprising:

receiving a subscription authorization for a user to access a predefined number of software products from a plurality of the software products, wherein the subscription authorization is selected from a plurality of subscription authorizations, each providing access to a different quantity of software products, and wherein the subscription authorization permits selectively removing one of the predefined number of software products and adding a new one of the predefined number of software products before the end of a rental period associated with the removed one of the predefined number of software products;

receiving a selection identifying a selected software product to be rented by a user;

associating the selected software product with the subscription authorization; and enabling the user to access the selected software product over a network while the subscription authorization is valid.

84. A computer-implemented method for providing a rental service, the method comprising:

receiving an authorization for a user to access up to a predefined number of software products;

associating a number of identifiers with the authorization, wherein the number of identifiers is equal to the predefined number, and wherein each of the number of identifiers selectably identifies one of a plurality of software products, and wherein at least one of the identifiers is limited to identifying a priority level for one of the plurality of software products that is different from a priority level for another one of the plurality of software products;

receiving a selection identifying one of the plurality of software products;

associating the selection with one of the number of identifiers, indicating that the identified one of the plurality of software products is rented by the user; and enabling access over a network to the identified one of the plurality of software products, the access being enabled for a predefined period associated with authorization.

* * * * *

UNITED STATES PATENT AND TRADEMARK OFFICE
CERTIFICATE OF CORRECTION

PATENT NO. : 7,523,071 B2  Page 1 of 1
APPLICATION NO. : 10/667129
DATED : April 21, 2009
INVENTOR(S) : Allen Fox et al.

It is certified that error appears in the above-identified patent and that said Letters Patent is hereby corrected as shown below:

In column 1, lines 13-14, delete "Protocol/Intern" and insert -- Protocol/Internet --, therefor.

In column 5, line 9, delete "11B." and insert -- 1B. --, therefor.

In column 17, line 56, claim 76, after "The" insert -- software --.

In column 18, line 45, claim 80, delete "level,;" and insert -- level; --, therefor.

Signed and Sealed this

Twenty-first Day of July, 2009

JOHN DOLL
*Acting Director of the United States Patent and Trademark Office*